United States Patent
Proehl et al.

[11] Patent Number: 6,034,684
[45] Date of Patent: Mar. 7, 2000

[54] IDENTIFICATION OF DATA ITEMS ON A SCREEN DISPLAY USING LANDMARK AND GRID LINE GRAPHICAL OBJECTS

[75] Inventors: Andrew Proehl; Franklin Servan-Schreiber, both of New York City; Ken Herndon, Suffern; Eduardo Sciammarella, New York City, all of N.Y.

[73] Assignees: Sony Corporation, Tokyo, Japan; Sony Electronics, Inc., Park Ridge, N.J.

[21] Appl. No.: 08/977,416

[22] Filed: Nov. 24, 1997

[51] Int. Cl.⁷ ............................................. G06F 3/14
[52] U.S. Cl. .......................... 345/339; 345/341; 345/348
[58] Field of Search ................................ 345/339, 346, 345/348, 349, 352, 357, 341, 342, 121, 123, 125

[56] References Cited

U.S. PATENT DOCUMENTS

| | | |
|---|---|---|
| 5,123,087 | 6/1992 | Newell et al. ............................ 345/348 |
| 5,305,435 | 4/1994 | Bronson ............................... 345/342 X |
| 5,479,599 | 12/1995 | Rockwell et al. ...................... 345/349 |
| 5,535,403 | 7/1996 | Li et al. ................................. 345/348 |
| 5,564,004 | 10/1996 | Grossman et al. ..................... 345/348 |
| 5,694,561 | 12/1997 | Malamud et al. ...................... 345/346 |
| 5,801,699 | 9/1998 | Hocker et al. .......................... 345/348 |
| 5,835,090 | 11/1998 | Clark et al. ............................. 345/339 |
| 5,912,668 | 6/1999 | Sciammarella et al. ................ 345/348 |
| 5,920,313 | 7/1999 | Diedrichsen et al. .................. 345/339 |

*Primary Examiner*—Crescelle N. dela Torre
*Attorney, Agent, or Firm*—Frommer Lawerence & Haug, LLP.; William S. Frommer

[57] ABSTRACT

Data items are arranged into groups and each group is represented by a graphical object (a so-called landmark) for easily identifying each group and its corresponding data items on a screen display. The landmark may have display attributes (such as shape, color, size, function, animation, etc.) which are different from the display attributes of another landmark. Each landmark has two non-parallel lines (grid lines) associated therewith and is positioned at the intersection of the two lines providing directional orientation when the landmark is displaced on the screen display.

11 Claims, 7 Drawing Sheets

IDENTIFICATION OF DATA ITEMS ON A SCREEN DISPLAY USING LANDMARK AND GRID LINE GRAPHICAL OBJECTS

BACKGROUND OF THE INVENTION

The present invention is related to a Graphical User Interface (GUI) and, in particular, to apparatus and method for easily and quickly identifying a group of data items from a number of data items displayed on a screen display by using a preselected graphical object (that is, a so-called landmark) which represents a desired group of data items, wherein the data items are stored in a storage device being operative via a programmable controller and are displayed on the screen display being operative via the programmable controller.

As well known in the art, the Graphical User Interface allows a user of a computer system to view data items (such as still or full-motion images, for example) on the screen display in a simple and user-friendly manner. The displayed items may be graphical or textual, and are stored in a memory storage of the computer system.

Using an input device and the GUI features, the user may arrange items into groups such that each item within a group is related to other items within that same group. The relationship among the group items may be temporal, contextual, etc., as preselected by the user.

Use of a system that enables collecting, organizing and browsing data in a graphic and zoomable space creates certain needs for navigating this data. Zooming, which allows the user to make on-screen objects larger and smaller, creates the need to organize information in new ways.

In a purely graphical space, data is organized geographically while in a zooming space, data may be organized by relative size. As more and more data objects are arranged geographically, it becomes hard to find particular objects in the space. Also as on-screen objects are zoomed out (made smaller), the objects appear to merge with each other and then disappear.

That is, as the displayed items (and the corresponding groups) increase on the screen display, it becomes more and more difficult for the user to identify individual items (objects) or even groups. Namely, in order to fit all of the items on the screen display, their size must decrease when new items are added. Clearly, at some point, the area of the display screen becomes too small for any intelligible viewing: the items become indistinguishable from each other, and the separation among the groups virtually disappears.

Under the above circumstances, when attempting to select a desired group or item from the group, the user may have to go through a "trial-and-error" selection process by increasing the size of the selected item (so-called "zooming in") by using a pointer of an input device such as a mouse, determining whether it is the desired item, reducing the size of the selected item (so-called "zooming out") if it is not what the user intended, and repeating this operation from the beginning with other items. It is apparent that the described selection procedure is inconvenient and time-consuming.

Another solution to the above viewing problem may include a concept of a so-called graphical universe. Namely, the graphical universe may include a virtually unbounded space in which the data items are located, while the screen display provides a viewing window into the universe (that is, displays a portion of the universe). By panning or scrolling in horizontal or vertical directions using the input device, the user may view the entire universe and keep adding new data items without reducing their size.

The disadvantage of this approach lies in the user's inability to view all of the items (or even groups) at the same time on the screen display.

With both geographic and zooming navigation needs, there is a need to develop various ways to help the user personalize, navigate and recognize its data.

OBJECTS OF THE INVENTION

It is an object of the present invention to overcome the above disadvantages.

It is another object of the present invention to provide a graphical object for representing a group of data items on a screen display.

It is a further object of the present invention to provide a graphical object having various display attributes for easily identifying on the screen display a group of data items associated with the graphical object.

SUMMARY OF THE INVENTION

These and other objects, features and advantages are accomplished by a system and method for controlling a screen display of data items. The data items are arranged into a number of groups on the screen. A graphical object is then generated and assigned to one of the groups for representing respective data items associated with that group.

In accordance with one aspect of the present invention, the graphical object is generated in such a way that its display attributes differ from the display attributes of another graphical object displayed on the screen display. The display attributes may include at least one of the following: shape, color, size, function and animation such as blinking, rotation, etc.

In accordance with another aspect of the present invention, two non-parallel lines are generated that correspond to the graphical object which is positioned at the intersection of the two lines. The lines provide directional orientation when displacing the graphical object on the screen display.

BRIEF DESCRIPTION OF THE DRAWINGS

The above-mentioned as well as additional objects, features and advantages of the present invention will become readily apparent from the following detailed description thereof which is to be read in conjunction with the accompanying drawings, in which.

In all Figures, like reference numerals represent the same or identical components of the present invention.

DETAILED DESCRIPTION OF THE PREFERRED EMBODIMENTS

The present invention will now be explained in detail with reference to the accompanying drawings.

Figure 1:
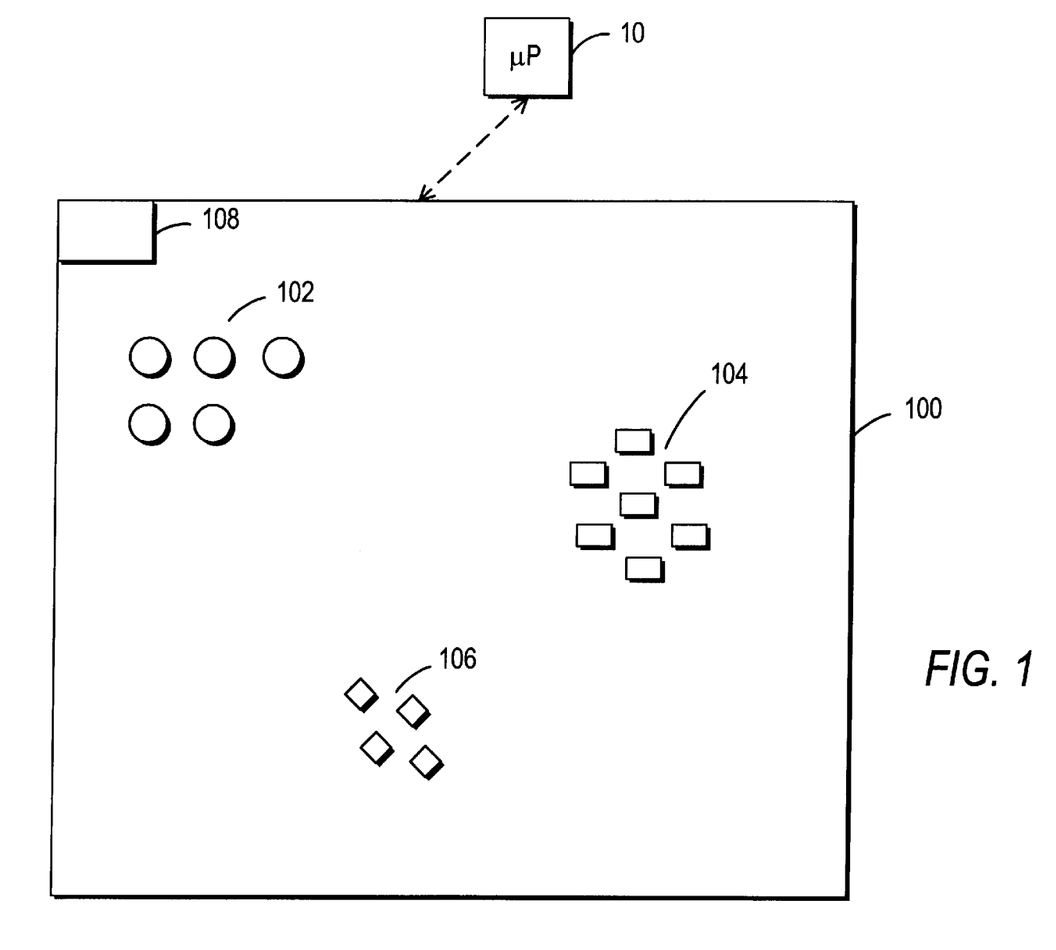
FIG. 1 is a screen display of data items (such as digitized photographs, for example) arranged into three groups.

FIG. 1 shows a screen display 100 of a computer system controlled by a microprocessor 10 having an input device (not shown), such as a mouse, lightpen or keyboard for manipulating data items on the screen display 100 of a monitor, etc. of the computer system. As further illustrated in FIG. 1, a plurality of data items are representatively displayed on the display screen 100. The data items are arranged into three groups according to preselected user criteria.

For example, the user decides to scan (digitize) photographs in a family album and to enter the images of the photographs into the computer system. Obviously, one of the advantages of the images stored in the computer system is the user's ability to sort the images in a particular, preselected order and to quickly access these images. Thus, the user arranges the images of the family album photographs displayed on the screen display 100 into three groups, for example: a first group 102 may contain digitized photographs from the wedding (that is, wedding pictures); a second group 104 may include baby pictures; and a third group 106 may be pictures from the 6-month cruise around the world.

Figure 2:
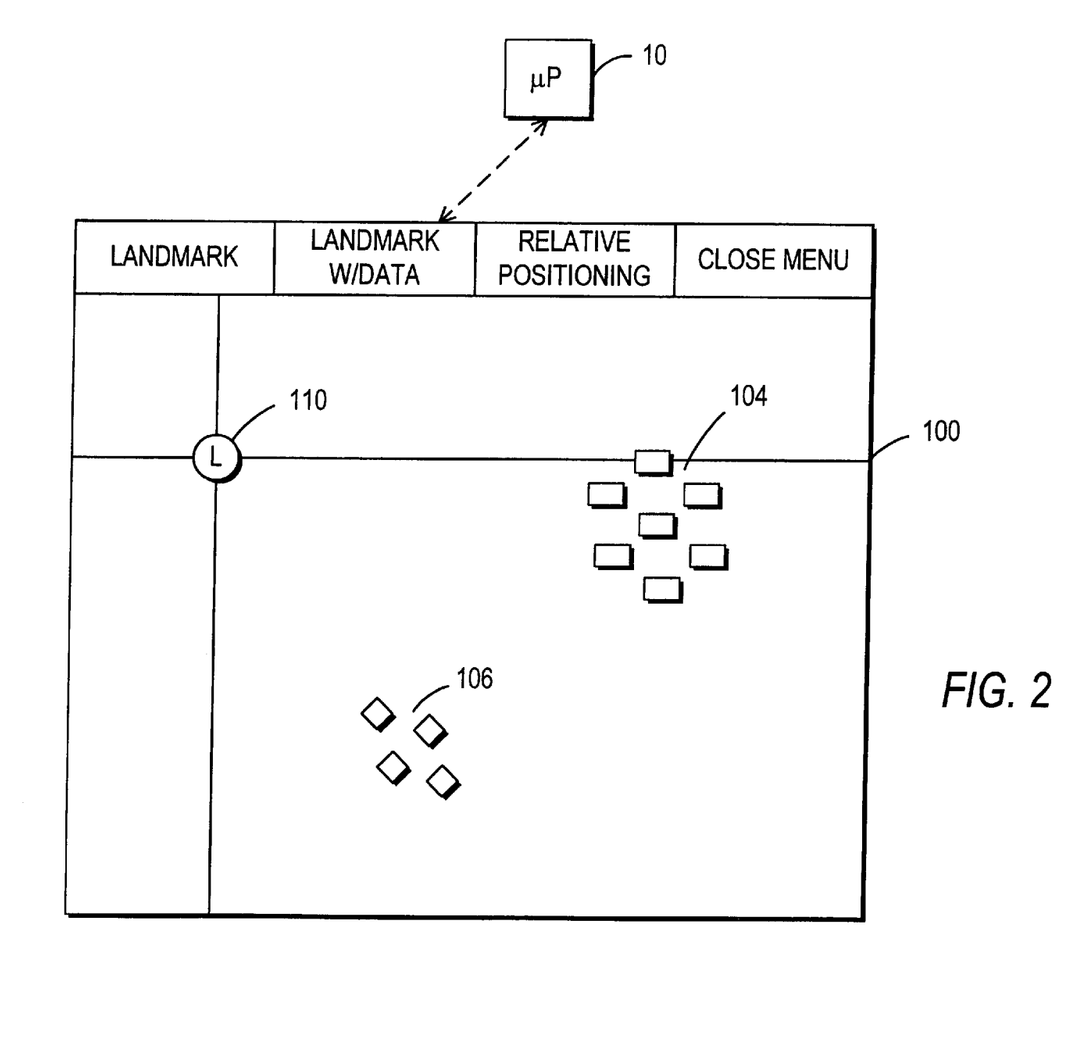
FIG. 2 is a screen display of a graphical object (landmark) for representing one of the groups in FIG. 1 while the corresponding data items are hidden from view in accordance with the present invention.

After separating the images into the three groups, the user activates a menu, for example, on the screen display 100, as shown in FIG. 2. That is, let it be assumed that the user manipulates the input device (not shown) so that a menu "zooms out" (appears) on the screen display 100 as shown in FIG. 2. As an example, the user manipulation may include placing a cursor on a box 108 (FIG. 1) and activating (clicking) a particular button on the mouse, etc. It is understood, of course, that other ways of activating and/or placing a menu on the display screen 100 are possible, as known to those skilled in the art of Graphical User Interfaces.

One of the items in the menu is a "landmark" feature. By selecting and activating this feature and then pointing a cursor at the group 102, the user can hide this group (the wedding images) and replace it with a graphical object (a so-called landmark 110) for representing the wedding images. As shown in FIG. 2, grid lines (that is, horizontal and vertical lines) appear on the screen display in response to the user activation of the "landmark" menu item, at the intersection of which the landmark 110 is positioned.

The landmark 110 has a shape which uniquely identifies the group 102. That is, the user may be given a choice of selecting a graphical object from a sub-menu or palette, for example, which may appear on the screen display 100 in response to the "landmark" menu item selection; or the user may even create its own graphical symbol for identifying the group of data items. In addition to shape, such display attributes as color and size of the landmarks may be freely selected to associate the group of data items with the corresponding landmark.

Figure 3:
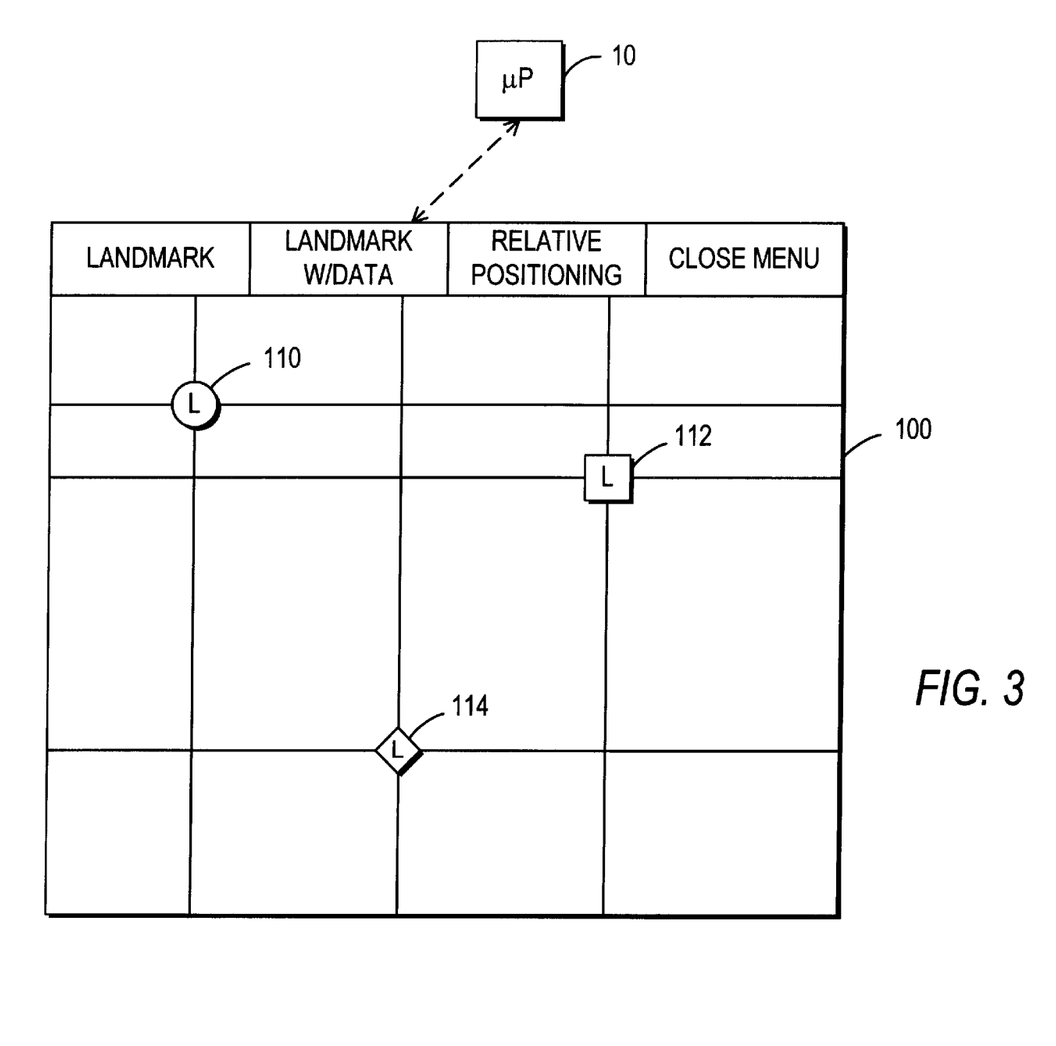
FIG. 3 is a screen display of all three groups of FIG. 1 being represented by the corresponding landmarks in accordance with the present invention.

FIG. 3 shows the screen display 100 with all three groups 102, 104, 106 being replaced with (and represented by) landmarks 110, 112, 114, respectively. As is apparent from the figure, the landmarks 110, 112, 114 "personalize" the user space in the graphical universe. Namely, the screen display 100 takes on the appearance of a street map: the grid lines that give the universe structure and pattern are referred to by the user when navigating its space, while the landmarks allow the user to easily recognize data items stored at a particular portion of the universe. This is similar to people's natural inclination to use landmarks in the real world to identify or memorize things, or to find their way around.

Another analogy with the present inventive aspect may be a desk where a person at the desk prioritizes the items by placing one group of items on a right side, another groups of items in the middle of the desk, and a third groups of items on a left side of the desk. Similarly, the viewing area as shown in FIG. 3 provides a personal user space, allowing one to prioritize and easily recognize where various groups of data items are displayed (stored) in the universe.

As previously stated, in accordance with one aspect of the present invention, the landmarks may have different shapes, sizes, colors, etc. to provide easy-to-remember identification of data items represented by a respective landmark.

Figure 4:
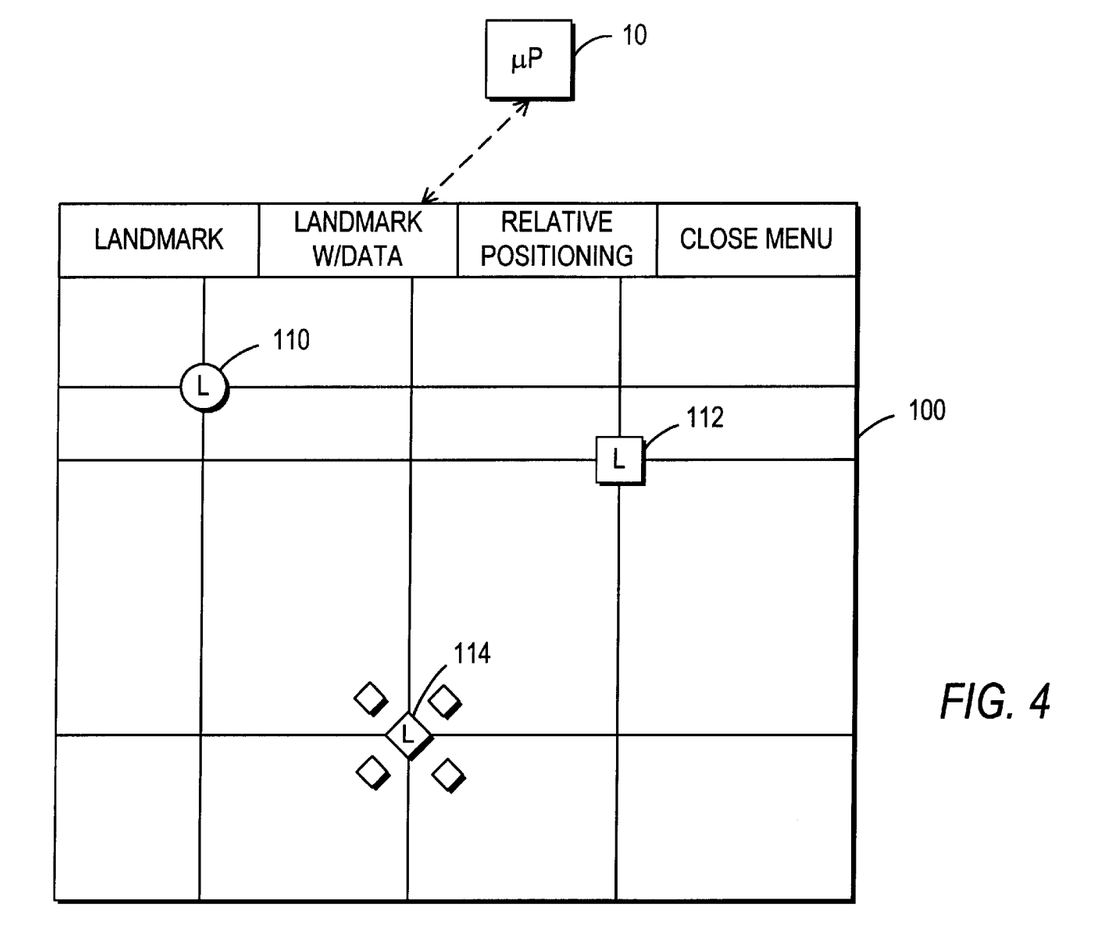
FIG. 4 is a screen display of one landmark being displayed with its corresponding data items according to one aspect of the present invention.

In accordance with another aspect, the user may decide not to hide data items associated with the corresponding landmark, as shown in FIG. 4. That is, by selecting another menu item ("Landmark with Data Items" for example), the user may view the landmark 114 with its associated data items (images of photographs taken on the 6-month world cruise). This option may be useful in selecting only those data items which are currently of interest, without cluttering up the viewing space with other data items associated with the corresponding landmarks.

In accordance with yet another aspect of the present invention, each landmark may have a plurality of functions associated with it. Namely, when the user zooms in or clicks on the landmark, a menu of functions 116 appears in correspondence with that landmark, as illustratively shown in FIG. 5. Each menu item represents a particular function performed on the data items and/or the landmark itself, such as "Display", "Sort", "Search", "Animation", "Clock", "Beacon", "Sound". By choosing the menu item "Sort" from the menu of functions 116, the images are sorted on the screen display, as specified by the user, for example. Further, a particular image may be searched for by using the "Search" menu item, or animation/sound may be reproduced, if available, according to another menu item. The "Beacon" menu item may, for example, provide a blinking landmark to give even further importance to that particular group of data items, if desired.

Figure 5:
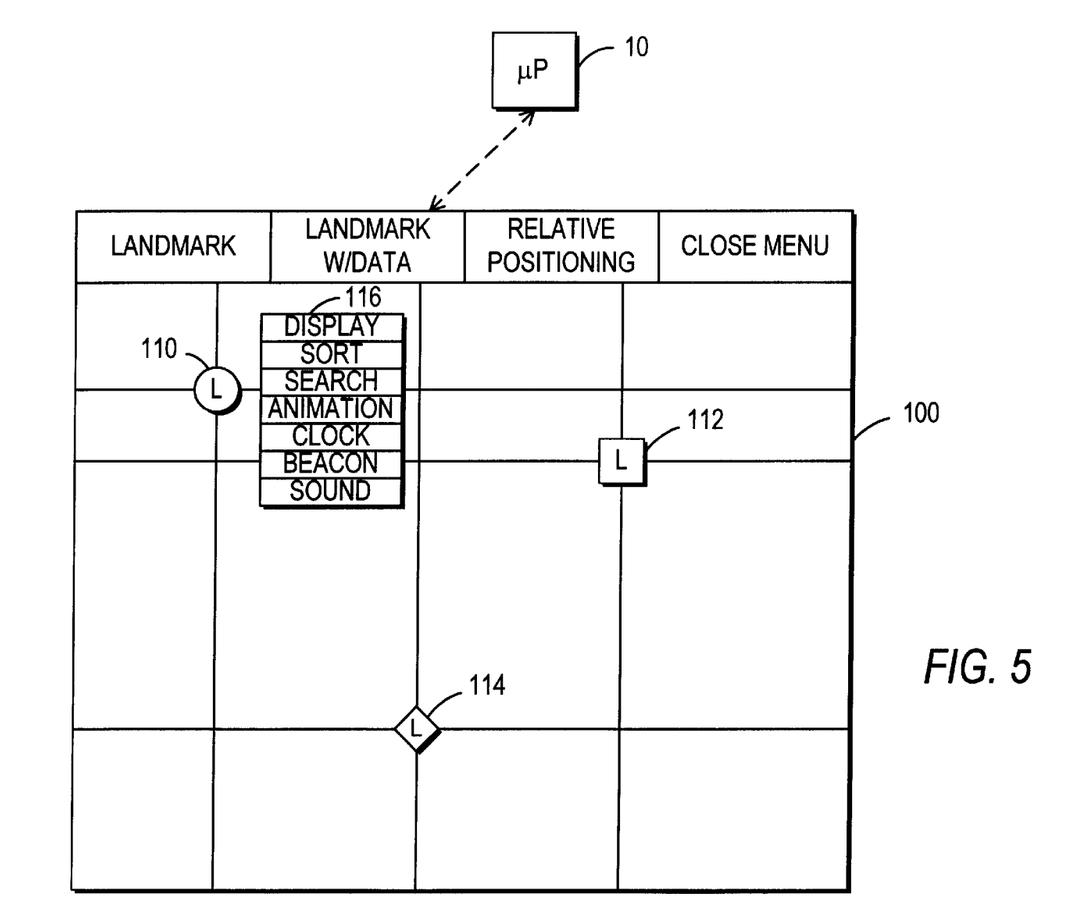
FIG. 5 is a screen display of a menu of functions associated with the corresponding landmark according to another aspect of the present invention.

It will be appreciated that certain menu items in the menu of functions 116 may have additional sub-menu items, so-called drop-down lists, which are displayed when that menu item is selected by the user. For example, the "Sort" menu item may offer the drop-down list of various options available to the user for sorting the images (by date when the picture was taken, by date when entered into the computer system, etc.).

Figure 6:
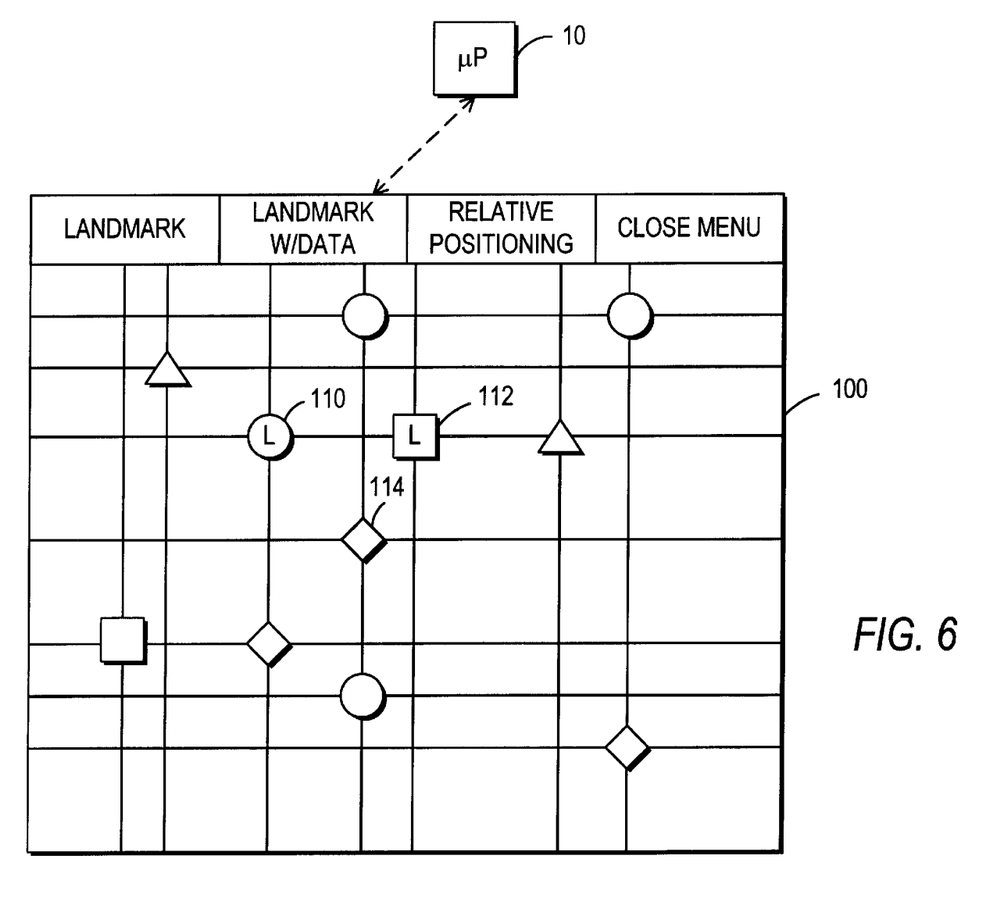
FIG. 6 is a display screen of the "relative positioning" feature according to yet another aspect of the present invention.

In accordance with still another aspect of the present invention, all landmarks in the graphical universe may be displayed on the screen display 100 by using a "relative positioning" feature. As stated above, the concept of the graphical universe includes a virtually unbounded space in which data items (represented by landmarks according to the present invention) are located. The screen display 100 provides a window into the universe (that is, a view of a portion of the universe). By panning or scrolling in the horizontal and/or vertical direction using the grid lines as the navigation tool, the user can determine where in the universe the landmarks (with its corresponding data items) are located with respect to other landmarks (and data items). Further, if the user desires to obtain the view of the entire universe, the "Relative positioning" menu item may be activated.

This feature of the present invention (that is, the relative positioning) places all landmarks on the screen display 100, while maintaining the relative position of each landmark with respect to other landmarks as shown in FIG. 6. In particular, as the "Relative Positioning" feature is activated (that is, this feature can be turned on and off whereby the view is switched between the true positioning and relative positioning), the position of each landmark in the graphical universe is adjusted in such a way as to bring the landmarks into the viewing portion (that is, the screen display 100) while maintaining their relative positions with respect to each other. As a result, a complete "picture" of the landmarks may be obtained and their positions in the graphical universe. It is noted that as the "Relative Positioning" feature is activated, the space is reduced while the predetermined size of each landmark remains constant. In addition, the grid lines may merge with each other during the relative positioning.

The general idea of persistence is that certain objects tend to remain visible and constant in size when zooming out while other objects around them tend to become smaller and/or disappear.

In the representative zooming space, there are at least three types of objects: data objects, landmarks, and grid lines. These objects function slightly differently when the space is being zoomed. Data objects function the same as one would normally expect: that is, as the data objects are zoomed out, they appear to become smaller and smaller until they eventually disappear.

In contrast to this, landmarks and grid lines are said to be persistent. Landmarks have a minimum size, and once they reach that minimum size, the landmarks stay at that size even as the data objects around them continue to become smaller. When one landmark comes into contact with another, the two will "collapse" into one with the oldest landmark remaining. Grid lines are also persistent. They appear as a single line and do not change in width when zooming in or out. As one grid line comes into contact with another parallel grid line, the two grid lines "collapse" into one and stay that way as long as the user is zooming out.

Thus, as data objects quickly decrease in size and/or disappear, landmarks and grid lines appear to remain persistent in size. As the user continues to zoom out, the landmarks and grid lines move closer to each other, "collapsing" on each other until eventually only a single landmark and one vertical and horizontal grid line are left on the screen. As the user zooms back in, he or she will see their space unfold with the single grid line separating and becoming two grid lines, then three, etc. The same will happen for landmarks until all grid lines and landmarks return to their separate and true positions.

Figure 7:
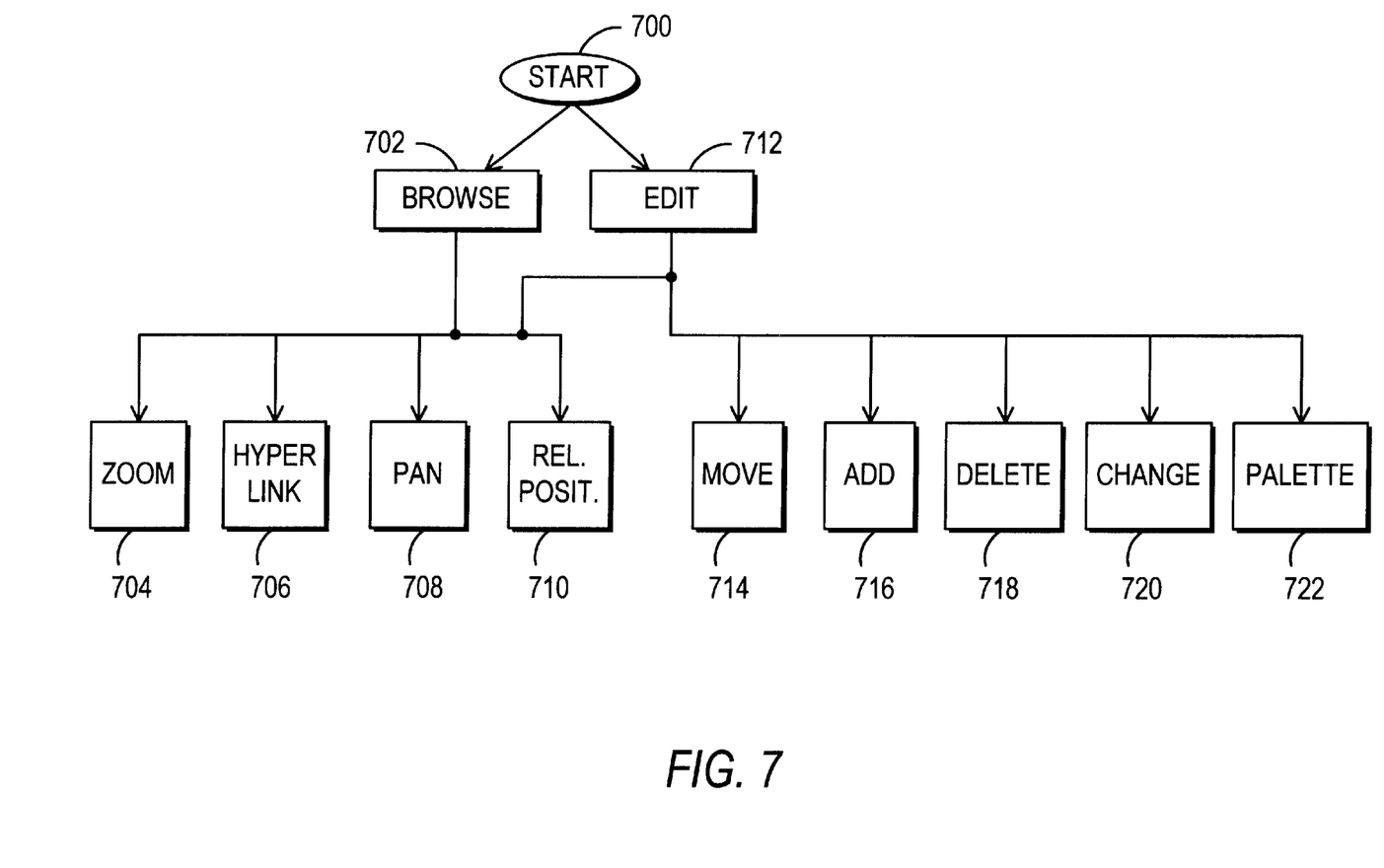
FIG. 7 is a functional diagram of the operation of a microprocessor for effecting the above and additional aspects of the present invention.

FIG. 7 is a functional diagram of the operation of the microprocessor 10 to effect the aspects of the present invention. After the step 700 in which the operation is initiated, two modes are encountered. In step 702, the "browse" mode (being a default mode) is executed where several operations may be carried out depending on the options selected by the user. Namely, in step 704, if the user zooms in on the landmark, the "zoom" feature, as carried out by the microprocessor 10, increases the size of the data items associated with the corresponding landmark 102, 104 or 106 on the screen display 100. The "Hyperlink" operation in step 706 moves the view so that the indicated landmark appears in the center of the screen display 100 for focusing on that landmark, if desired. In step 708, the microprocessor 10 is operative to change the view of the graphical universe in the X-Y direction (that is, to perform a so-called "panning" operation); while the "Relative Positioning" in step 710 allows the user to view all of the landmarks in the universe, where the microprocessor 10 is operative to reposition the landmarks in such a way as to display them on the screen display 100, as explained above.

If the "Edit" mode in step 712 is selected, several operations, in addition to those in the "Browse" mode become available to the user. In particular, if it is desired to move the landmarks and/or grid lines, the "move" procedure is carried out in step 714; in addition, the landmarks and/or data items may be added to the screen display 100 (step 716), deleted from the screen display 100 (step 718), or changed (step 720) in response to the user input. Further, in step 722, the "Palette" feature may be used to select the shape, color, etc. (that is, display attributes) of the existing or newly created landmarks.

FIGS. 1–6 show the screen display 100 under the control of the microprocessor 10. It will be appreciated that any other programmable controller (processor) may be programmed to effect the operations of the present invention as described above with reference to those figures and in accordance with the functional diagram of FIG. 7.

Having described specific preferred embodiments of the invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is:

1. A computer system for controlling a screen display of a plurality of data items, comprising:

a screen for displaying said screen display; and a controllable processor programmed to arrange said plurality of data items into a number of groups on said screen display, to generate a graphical object and to assign the generated graphical object to one of said groups for representing respective data items associated with said one group, said controllable processor being further programmed to generate two non-parallel lines corresponding to said graphical object which is positioned at an intersection of said two lines providing directional orientation when said graphical object is displaced on said screen display, said two non-parallel lines moving with said associated graphical object upon movement of said graphical object;

wherein said screen display is selectively displayable in at least two modes, a first display mode allowing said controllable processor to scroll said graphical object off said screen display such that additional graphical objects can be added and fit on said screen display without a reduction in size of said graphical object and said additional graphical objects, whereby a graphical universe exceeding said screen display is created, and a second display mode allowing said controllable processor to display all of said graphical universe on said screen display at one time in such a way that a relative positioning of said each graphical object in said graphical universe is maintained on said screen display.

2. The computer system according to claim 1, wherein said controllable processor is programmed to generate said graphical object in such a way that display attributes of the generated graphical object differ from said display attributes of another graphical object displayed on said screen display.

3. The computer system according to claim 2, wherein said display attributes include at least one of the following: shape, color, size, animation and function.

4. The computer system according to claim 1, wherein said controllable processor is programmed to display said graphical object with the data items in said associated group.

5. The computer system according to claim 1, wherein said controllable processor is programmed to generate on said screen display a menu of functions associated with said graphical object, said menu of functions containing multiple menu items for selectively performing multiple operations on said graphical object or the data items in said group associated with said graphical object.

6. The computer system according to claim 1, wherein said controllable processor is programmed to selectively switch between said relative positioning and a true positioning representing actual positioning of said graphical object in said graphical universe.

7. A method for controlling a screen display of a plurality of data items, comprising the steps of:

arranging said plurality of data items into a number of groups on said screen display;

generating a graphical object;

assigning the generated graphical object to one of said groups for representing respective data items associated with said one group;

generating two non-parallel lines corresponding to said graphical object which is positioned at an intersection of said two lines providing directional orientation when said graphical object is displaced on said screen display, said two non-parallel lines moving with said associated graphical object upon movement of said graphical object;

scrolling said graphical object off said screen display such that additional graphical objects can be added and fit on said screen display without a reduction in size of said graphical object and said additional graphical objects, whereby a graphical universe exceeding said screen display is created; and displaying all of said graphical universe on said screen display at one time in such a way that a relative position of said each graphical object in said graphical universe is maintained on said screen display.

8. The method according to claim 7, wherein display attributes of the generated graphical object differ from said display attributes of another graphical object displayed on said screen display.

9. The method according to claim 8, wherein said display attributes include at least one of the following: shape, color, size, function and animation.

10. The method according to claim 7, wherein said graphical object is displayed with the data items in said associated group.

11. The method according to claim 7, further comprising generating on said screen display a menu of functions associated with said graphical object, said menu of functions containing multiple menu items for selectively performing multiple operations on said graphical object or the data items in said group associated with said graphical object.

* * * * *